(12) United States Patent
Bae et al.

(10) Patent No.: US 11,621,433 B2
(45) Date of Patent: Apr. 4, 2023

(54) PROTON EXCHANGE MEMBRANE MATERIAL AND METHODS OF MAKING THE SAME

(71) Applicant: RENSSELAER POLYTECHNIC INSTITUTE, Troy, NY (US)

(72) Inventors: Chulsung Bae, Cohoes, NY (US); Eun Joo Park, Troy, NY (US); Junyoung Han, Troy, NY (US)

(73) Assignee: RENSSELAER POLYTECHNIC INSTITUTE, Troy, NY (US)

( * ) Notice: Subject to any disclaimer, the term of this patent is extended or adjusted under 35 U.S.C. 154(b) by 0 days.

(21) Appl. No.: 16/471,358

(22) PCT Filed: Dec. 20, 2017

(86) PCT No.: PCT/US2017/067482
§ 371 (c)(1),
(2) Date: Jun. 19, 2019

(87) PCT Pub. No.: WO2018/119020
PCT Pub. Date: Jun. 28, 2018

(65) Prior Publication Data
US 2020/0091535 A1 Mar. 19, 2020

Related U.S. Application Data (60) Provisional application No. 62/436,627, filed on Dec. 20, 2016, provisional application No. 62/599,045, filed on Dec. 15, 2017.

(51) Int. Cl.
| | | |
|---|---|---|
| *H01M 8/1023* | (2016.01) | |
| *C08G 61/02* | (2006.01) | |
| *C08J 5/22* | (2006.01) | |
| *H01M 8/1039* | (2016.01) | |

(52) U.S. Cl.
CPC .......... *H01M 8/1023* (2013.01); *C08G 61/02* (2013.01); *C08J 5/2262* (2013.01); *H01M 8/1039* (2013.01); *C08G 2261/126* (2013.01); *C08G 2261/146* (2013.01); *C08G 2261/148* (2013.01); *C08G 2261/1412* (2013.01); *C08G 2261/1424* (2013.01); *C08G 2261/1452* (2013.01); *C08G 2261/312* (2013.01); *C08G 2261/3326* (2013.01); *C08G 2261/516* (2013.01); *C08G 2261/77* (2013.01); *C08J 2365/00* (2013.01)

(58) Field of Classification Search
None
See application file for complete search history.

(56) References Cited

U.S. PATENT DOCUMENTS

| | | | |
|---|---|---|---|
| 6,590,067 B2 | 7/2003 | Kerres et al. | |
| 7,078,121 B2 | 7/2006 | Kanaoka et al. | |
| 7,615,300 B2 | 11/2009 | Bae | |
| 7,671,157 B2 | 3/2010 | Bae | |
| 7,888,397 B1 | 2/2011 | Hibb et al. | |
| 8,445,141 B2 | 5/2013 | Kitamura et al. | |
| 8,697,203 B2 | 4/2014 | Koening | |
| 8,809,483 B1 | 8/2014 | Hibbs et al. | |
| 9,051,431 B2 | 6/2015 | Kim et al. | |
| 9,276,282 B2 | 3/2016 | Zhang et al. | |
| 9,534,097 B2 | 1/2017 | Hibbs | |
| 9,580,541 B1 | 2/2017 | Fujimoto et al. | |
| 9,988,526 B2 | 6/2018 | Rodrigues et al. | |
| 10,053,534 B2 | 8/2018 | Fujimoto | |
| 10,053,535 B2 | 8/2018 | Kim et al. | |
| 10,170,799 B2 | 1/2019 | Ouchie et al. | |
| 10,272,424 B2 | 4/2019 | Bae et al. | |
| 10,290,890 B2 | 5/2019 | Yan et al. | |
| 10,294,325 B2 | 5/2019 | Fujimoto | |
| 10,370,483 B2 | 8/2019 | Kim et al. | |

(Continued)

FOREIGN PATENT DOCUMENTS

| | | |
|---|---|---|
| CN | 102869448 | 1/2013 |
| CN | 103694490 | 4/2014 |

(Continued)

OTHER PUBLICATIONS

International Search Report and the Written Opinion of the International Searching Authority from International Patent Application No. PCT/US2017/067482, dated Mar. 8, 2018.
Simple, Effective Molecular Strategy for the Design of Fuel Cell Membranes: Combination of Perfluoroalkyl and Sulfonated Phenylene Groups. Takashi Mochizuki, Makoto Uchida, and Kenji Miyatake. ACS Energy Letters, 2016, 1 (2), 348-352, Jul. 6, 2016.
Aromatic Polymer with Pendant Perfluoroalkyl Sulfonic Acid for Fuel Cell Applications. Ken Yoshimura and Katsuhiko Iwasaki. Macromolecules 2009 42 (23), 9302-9306, Oct. 14, 2009.
Office Action dated Jan. 6, 2021, for U.S. Appl. No. 16/628,879.

(Continued)

*Primary Examiner* — Laura Weiner
(74) *Attorney, Agent, or Firm* — Weaver Austin Villenueve & Sampson LLP (57) ABSTRACT

Hydrocarbon proton exchange membranes are disclosed that are composed of a material including a hydrophobic main chain, and acidic side chains. The main chain includes a polyaryl structure that is substantially free of ether linkages and also includes a fluoromethyl substituted carbon. The acidic side chains include a hydrocarbon tether terminated by a strongly acidic group, such as a fluoroalkyl sulfonate group. Chemical stability of the material is increased by removing the ether linkages from the main chain. The hydrophobic main chain and substantially hydrophilic side chains create a phase-separated morphology that affords enhanced transport of protons and water across the membrane even at low relative humidity levels. These materials are advantageous as membranes for use in fuel cells, redox flow batteries, water hydrolysis systems, sensors, electrochemical hydrogen compressors, actuators, water purifiers, gas separators, etc.

13 Claims, 3 Drawing Sheets

(56) References Cited

U.S. PATENT DOCUMENTS

| | | | |
|---|---|---|---|
| 10,435,504 | B2 | 10/2019 | Bae et al. |
| 11,236,196 | B2 | 2/2022 | Bae et al. |
| 2002/0061431 | A1 | 5/2002 | Koyama et al. |
| 2002/0062046 | A1 | 5/2002 | Swan et al. |
| 2003/0056669 | A1 | 3/2003 | Miller et al. |
| 2003/0114598 | A1 | 6/2003 | Li et al. |
| 2003/0134936 | A1 | 7/2003 | West et al. |
| 2003/0173547 | A1 | 9/2003 | Yamakawa et al. |
| 2006/0004177 | A1 | 1/2006 | Gao et al. |
| 2006/0135702 | A1 | 6/2006 | Wang et al. |
| 2007/0048579 | A1 | 3/2007 | Bae |
| 2008/0262163 | A1 | 10/2008 | Bae |
| 2009/0004528 | A1* | 1/2009 | Fritsch ............... H01M 8/1023 429/494 |
| 2009/0280383 | A1 | 11/2009 | MacKinnon et al. |
| 2010/0041834 | A1 | 2/2010 | Bae |
| 2010/0047657 | A1 | 2/2010 | MacKinnon et al. |
| 2010/0279204 | A1 | 11/2010 | Isomura et al. |
| 2011/0207028 | A1 | 8/2011 | Fukuta et al. |
| 2014/0024728 | A1 | 1/2014 | Kim et al. |
| 2014/0227627 | A1 | 8/2014 | He et al. |
| 2014/0275300 | A1 | 9/2014 | Kim et al. |
| 2014/0353241 | A1 | 12/2014 | Yin et al. |
| 2015/0111128 | A1 | 4/2015 | Matsuda et al. |
| 2017/0203289 | A1 | 7/2017 | Bae et al. |
| 2017/0252707 | A1 | 9/2017 | Bahar et al. |
| 2017/0355811 | A1 | 12/2017 | Bae et al. |
| 2019/0308185 | A1 | 10/2019 | Bae et al. |
| 2020/0055980 | A1 | 2/2020 | Bae et al. |
| 2020/0094241 | A1 | 3/2020 | Bae et al. |
| 2020/0172659 | A1 | 6/2020 | Bae et al. |
| 2020/0223997 | A1 | 7/2020 | Bae et al. |
| 2020/0238272 | A1 | 7/2020 | Bae et al. |
| 2021/0108067 | A1 | 4/2021 | Bae et al. |
| 2022/0052357 | A1 | 2/2022 | Bae et al. |
| 2022/0227921 | A1 | 7/2022 | Bae et al. |
| 2022/0266239 | A1 | 8/2022 | Bae et al. |

FOREIGN PATENT DOCUMENTS

| | | |
|---|---|---|
| CN | 106040318 | 10/2016 |
| EP | 2324529 | 1/2016 |
| JP | H06188005 | 7/1994 |
| JP | 2001-002738 | 1/2001 |
| JP | H15203648 | 7/2003 |
| JP | 2004-131662 | 4/2004 |
| JP | 2012-049111 | 3/2012 |
| JP | 2013-505825 A | 2/2013 |
| JP | 2016-032098 A | 3/2016 |
| JP | 2018-502180 | 1/2018 |
| KR | 20140064308 | 5/2014 |
| KR | 20150060159 | 6/2015 |
| WO | WO2006/066505 | 6/2006 |
| WO | WO2007/079004 | 7/2007 |
| WO | WO2012/081026 | 6/2012 |
| WO | WO2016/014636 | 1/2016 |
| WO | WO 2016/081432 * | 5/2016 |
| WO | WO2017/172824 | 10/2017 |
| WO | WO2019/010290 | 1/2019 |
| WO | WO2019/068051 | 4/2019 |
| WO | WO2018/119020 | 6/2019 |

OTHER PUBLICATIONS

Ex Parte Quayle Action issued on Mar. 5, 2019, in U.S. Appl. No. 15/527,967.
Notice of Allowance dated May 29, 2019, in U.S. Appl. No. 15/527,967.
International Search Report and Written Opinion dated Nov. 30, 2018 in Application No. PCT/US2018/040898.
International Search Report dated Dec. 4, 2018 in Application No. PCT/US2018/040898.
International Preliminary Report on Patentability dated Jan. 7, 2020 in Application No. PCT/US2018/040898.
International Search Report and Written Opinion dated Feb. 4, 2016, in Application No. PCT/US2015/061036.
International Preliminary Report on Patentability dated May 23, 2017, in Application No. PCT/US2015/061036.
CN Search Report dated Oct. 28, 2019 in Application No. 201580062578.2.
CN Supplemental Search Report dated Mar. 25, 2020 in Application No. 201580062578.2.
EP Supplemental Search Report and Written Opinion dated Jun. 15, 2018, in Application No. 15860054.4.
EP Notice of Reason of First Refusal dated May 12, 2020, in Application No. 15860054.4.
JP Notice of Refusal dated Oct. 23, 2019 for Application No. 2017-526894.
JP Notice of Refusal dated May 12, 2020 for Application No. 2017-526894.
JP Search Report by Authorized Searching Authority dated Sep. 18, 2019 for Application No. 2017-526894.
JP Notice of Refusal dated Dec. 15, 2020 for Application No. 2020-008602.
JP Search Report by Authorized Searching Authority dated Nov. 17, 2020 for Application No. 2020-008602.
International Search Report and Written Opinion dated Sep. 16, 2019, in Application No. PCT/US2019/028925.
International Preliminary Report on Patentability dated Oct. 27, 2020, in Application No. PCT/US2019/028925.
International Search Report and Written Opinion dated Mar. 25, 2020, in Application No. PCT/US2019/063173.
Ayers K, "Benchmarking Advanced Water Splitting Technologies: Best Practices in Materials Characterization," presented at the 2020 U.S. Department of Energy Hydrogen and Fuel Cells Program Annual Merit Review and Peer Evaluation Meeting on May 20, 2020, accessible at https://www.hydrogen.energy.gov/pdfs/review20/p170_ayers_2020_o.pdf (last accessed Dec. 15, 2020), 21 pp.
Ayers K, "Economic Production of Hydrogen through the Development of Novel, High Efficiency Electrocatalysts for Alkaline Membrane Electrolysis," presented at the 2017 U.S. Department of Energy (DOE) Hydrogen and Fuel Cells Program and Vehicle Technologies Office Annual Merit Review and Peer Evaluation Meeting on Jun. 5-9, 2017 in Washington, D.C., accessible at https://www.hydrogen.energy.gov/pdfs/review17/pd147_ayers_2017_o.pdf (last accessed Dec. 15, 2020), 29 pp.
Bae C et al., "Cyclic Olefin Copolymer-Based Alkaline Exchange Polymers and Reinforced Membranes" in 2019 Annual Progress Report: DOE Hydrogen and Fuel Cells Program, U.S. Department of Energy, Document No. DOE/GO-102020-5257, Apr. 2020, accessible at https://www.hydrogen.energy.gov/pdfs/progress19/fc_fc307_bae_2019.pdf (last accessed Dec. 15, 2020), 5 pp.
Bae C, "Cyclic Olefin Copolymer based Alkaline Exchange Polymers and Reinforced Membranes," presented at the 2019 U.S. Department of Energy (DOE) Hydrogen and Fuel Cells Program Annual Merit Review and Peer Evaluation Meeting on Apr. 29-May 1, 2019 in Crystal City, Virginia, accessible at https://www.hydrogen.energy.gov/pdfs/review19/fc307_bae_2019_p.pdf (last accessed Dec. 15, 2020), 13 pp.
Bae C, "Channeling Engineering of Hydroxide Ion Exchange Polymers and Reinforced Membranes," presented at the 2019 U.S. Department of Energy (DOE) Hydrogen and Fuel Cells Program Annual Merit Review and Peer Evaluation Meeting on Apr. 29-May 1, 2019 in Crystal City, Virginia, accessible at https://www.hydrogen.energy.gov/pdfs/review19/arpae09_bae_2019_p.pdf (last accessed Dec. 15, 2020), 26 pp.
Bae C, "Cyclic Olefin Copolymer based Alkaline Exchange Polymers and Reinforced Membranes," presented at the 2020 U.S. Department of Energy Hydrogen and Fuel Cells Program Annual Merit Review and Peer Evaluation Meeting on May 19, 2020, accessible at https://www.hydrogen.energy.gov/pdfs/review20/fc307_bae_2020_o.pdf (last accessed Dec. 15, 2020), 21 pp.
Bae C, "Development of Versatile Polymer Materials for Anion Exchange Membranes in Electrochemical Energy Conversion Technology," ECS Meeting Abstracts, 2020, MA2020-02, 2363 (1 p.).

(56) References Cited

OTHER PUBLICATIONS

Bae C, "Ion Conducting Polymer Electrolyte Membranes for Energy Conversion Technology," presented at the Rensselaer Polytechnic Institute Center for Future Energy Systems (RPI CFES) Symposium on Apr. 10, 2019 in Troy, New York, accessible at https://cfes.rpi.edu/sites/default/fdes/A7%20Bae.pdf (last accessed Dec. 15, 2020), 19 pp.

Bae C, "New functional polymers for alternative energy applications," presented at University of Nevada, Las Vegas (UNLV) Renewable Energy Symposium on Aug. 20, 2008 in Las Vegas, Nevada, accessible at https://digitalscholarship.unlv.edu/cgi/viewcontent.cgi?article=1023&context=res (last accessed Jan. 16, 2021), 21 pp.

Briem M et al., "Comparison of Novel 1, 1-Diphenylethylene Alternating Copolymer and Polystyrene Based Anion Exchange Membranes," ECS Meeting Abstracts, 2020, MA2020-2, 2242 with Presentation (31 pp.).

Chang Y et al., "Partially fluorinated sulfonated poly (ether amide) fuel cell membranes: influence of chemical structure on membrane properties," Polymers 3(1), 222-235.

Chang Y et al., "Polystyrene-based superacidic solid acid catalyst: synthesis and its application in biodiesel production," RSC advances, 2014, 4(88), 47448-47454.

Chung HT et al., "Effect of organic cations on hydrogen oxidation reaction of carbon supported platinum," Journal of the Electrochemical Society, 2016, 163(14), F1503-F1509.

Dang H et al., "Poly(phenylene oxide) functionalized with quaternary ammonium groups via flexible alkyl spacers for High-Performance anion exchange membranes," Journal of Materials Chemistry A, 2015, 3, 5280-5284.

Einsla ML et al., "Toward improved conductivity of sulfonated aromatic proton exchange membranes at low relative humidity," Chemistry of Materials, 2008, 20, 5636-5642.

Gottesfeld S et al., "Anion exchange membrane fuel cells: Current status and remaining challenges," Journal of Power Sources, 2018, 375, 170-184.

Gottesfeld S et al., "Direct ammonia fuel cells (DAFCs) fortransport application," presented at the 2019 U.S. Department of Energy (DOE) Hydrogen and Fuel Cells Program Annual Merit Review and Peer Evaluation Meeting on Apr. 29-May 1, 2019 in Crystal City, Virginia, accessible at https://www.hydrogen.energy.gov/pdfs/review19/arpae09_bae_2019_p.pdf (last accessed Dec. 15, 2020), 26 pp.

Hao J et al., "Crosslinked high-performance anion exchange membranes based on poly(styrene-b-(ethylene-co-butylene)-b-styrene)," Journal of Membrane Science, 2018, 551, 66-75.

Henkensmeier D et al., "Overview: State-of-the Art Commercial Membranes for Anion Exchange Membrane Water Electrolysis," Journal of Electrochemical Energy Conversion and Storage, 2021, 18, 024001 (18 pp.).

Hickner M et al., "Membrane Databases—New Schema and Dissemination (Supplement to: Development of Design Rules for High Hydroxide Transport in Polymer Architectures)," at the 2019 U.S. Department of Energy (DOE) Hydrogen and Fuel Cells Program Annual Merit Review and Peer Evaluation Meeting on Apr. 29-May 1, 2019 in Crystal City, Virginia, accessible at https://www.hydrogen.energy.gov/pdfs/review19/ia022_hickner_2019_p.pdf (last accessed Dec. 15, 2020), 14 pp.

Hwang T et al., "Ultrafiltration using graphene oxide surface-embedded polysulfone membranes," Separation and Purification Technology, 2016, 166, 41-47.

Jeon JY et al., "Ionic Functionalization of Polystyrene-b-poly(ethylene-co-butylene)-b-polstyrene via Friedel-Crafts Bromoalkylation and its Application for Anion Exchange Membranes," ECS Transactions, 2017, 80, 967-970.

Jeon JY et al., "Synthesis of aromatic anion exchange membranes by Friedel-Crafts bromoalkylation and cross-linking of polystyrene block copolymers," Macromolecules, 2019, 52(5), 2139-2147.

Jia W et al., "Gas transport characteristics of fluorinated polystyrene-b-polybutadiene-b-polystyrene (F-SBS)," Journal of Membrane Science, 2019, 591, 117296.

Kazakova, et al., "Trifluoromethanesulfonic Acid in Organic Synthesis," Russian Journal of Organic Chemistry, 2017, 53(4), 485-509.

Online Translation of Abstract, Claims, and Detailed Description of JP H06188005A retrieved from ESPACENET on Feb. 10, 2021 (20 pp.).

Kim S et al., "A Novel Sulfonated Aromatic Polymer Membrane with Different Pendant Groups for Vanadium Redox Flow Batteries (VRFBs)," 2018 AIChE Annual Meeting, 2018, 103g (3 pp.).

Kim S et al., "Novel Sulfonated Aromatic Polymer Membranes for Breaking the Coulombic and Voltage Efficiency Trade-Off Limitation in Vanadium Redox Flow Battery," 236th ECS Meeting (Oct. 13-17, 2019), ECS Meeting Abstracts, 2019, MA2019-02, 565 (2pp.).

Kim YS et al., "A New Class of Fuel Cells Based on Ion Pair-Coordinated Proton Exchange Membranes," 232nd ECS Meeting (Oct. 1-5, 2017), ECS Meeting Abstracts, 2017, MA2017-02, 1470 (2 pp.).

Kim YS et al., "HydroGEN Seedling: Scalable Elastomeric Membranes for Alkaline Water Electrolysis," in 2018 Annual Progress Report: DOE Hydrogen and Fuel Cells Program, U.S. Department of Energy, Document No. DOE/GO-102019-5156, Apr. 2019, accessible at https://www.hydrogen.energy.gov/pdfs/progress18/h2f_kim_2018.pdf (last accessed Dec. 15, 2020), 4 pp.

Kim YS et al., "Scalable Elastomeric Membranes for Alkaline Water Electrolysis," presented at the 2018 U.S. Department of Energy (DOE) Hydrogen and Fuel Cells Program Annual Merit Review and Peer Evaluation Meeting on Jun. 13-15, 2018 in Washington, D.C., accessible at https://www.hydrogen.energy.gov/pdfs/review18/pd159_kim_2018_p.pdf (last accessed Dec. 15, 2020), 23 pp.

Kim YS, "Advanced Materials for Fully-Integrated MEAs in AEMFCs," presented at the 2018 U.S. Department of Energy (DOE) Hydrogen and Fuel Cells Program and Vehicle Technologies Office Annual Merit Review and Peer Evaluation Meeting on Jun. 13-15, 2018 in Washington, DC, accessible at https://www.hydrogen.energy.gov/pdfs/review18/fc146_kim_2018_o.pdf (last accessed Dec. 15, 2020), 25 pp.

Kim YS, "Polymer-based fuel cells that operate from 80-220° C," presented at the 2018 U.S. Department of Energy (DOE) Hydrogen and Fuel Cells Program and Vehicle Technologies Office Annual Merit Review and Peer Evaluation Meeting on Jun. 13-15, 2018 in Washington, DC, accessible at https://www.hydrogen.energy.gov/pdfs/review18/fc175_kim_2018_o.pdf (last accessed Dec. 15, 2020), 24 pp.

Kim YS, "Scalable Elastomeric Membranes for Alkaline Water Electrolysis," presented at the 2019 U.S. Department of Energy (DOE) Hydrogen and Fuel Cells Program Annual Merit Review and Peer Evaluation Meeting on Apr. 29-May 1, 2019 in Crystal City, Virginia, accessible at https://www.hydrogen.energy.gov/pdfs/review19/p159_kim_2019_o.pdf (last accessed Dec. 15, 2020), 22 pp.

Kim YS, "Scalable Elastomeric Membranes for Alkaline Water Electrolysis," presented at the 2020 U.S. Department of Energy Hydrogen and Fuel Cells Program Annual Merit Review and Peer Evaluation Meeting on May 20, 2020, accessible at https://www.hydrogen.energy.gov/pdfs/review20/p159_kim_2020_p.pdf (last accessed Dec. 15, 2020), 29 pp.

Ko K et al., "Effect of Temperature on Nanophase-segregation and Transport in Polysulfone-Based Anion Exchange Membrane Fuel Cell: Molecular Dynamics Simulation Approach," Bulletin of the American Physical Society, 2013, 58(1), H1.307 (1 p.).

Kraglund MR et al., "Ion-solvating membranes as a new approach towards high rate alkaline electrolyzers," Energy & Environmental Science, 2019, 12, 3313-3318.

Kraglund MR et al., Supplementary information for "Ion-solvating membranes as a new approach towards high rate alkaline electrolyzers," Energy & Environmental Science, 2019, 12, 3313-3318 (19 pp.).

Kreuer KD, "On the development of proton conducting polymer membranes for hydrogen and methanol fuel cells," Journal of Membrane Science, 2001, 185, 29-39.

(56) References Cited

OTHER PUBLICATIONS

Lee WH et al., "Fluorene-based hydroxide ion conducting polymers for chemically stable anion exchange membrane fuel cell," ACS Macro Letters, 2015, 4(4), 453-457.

Lee WH et al., "Poly (terphenylene) anion exchange membranes: the effect of backbone structure on morphology and membrane property," ACS Macro Letters, 2017, 6(5), 566-570.

Lee YB et al., "Novel Synthetic Approach and their Properties for Alkaline Exchange Polysulfone Membranes," 2011 ECS Meeting Abstracts, MA2011-02, 866 (2 pp.).

Lee WH et al. "Robust Hydroxide Ion Conducting Poly(biphenyl)s for Alkaline Fuel Cell Membranes," ACS Macro Letters, 2015, 4(8), 814-818.

Lee WH et al., Supporting Information for "Robust Hydroxide Ion Conducting Poly(biphenyl)s for Alkaline Fuel Cell Membranes," ACS Macro Letters, 2015, 4(8), 814-818 (pp. 1-16).

Leng Y et al., "Solid-State Water Electrolysis with an Alkaline Membrane," Journal of the American Chemical Society, 2012, 134, 9054-9057.

Leng Y et al., Supporting Information for "Solid-State Water Electrolysis with an Alkaline Membrane," Journal of the American Chemical Society, 2012, 134, 9054-9057 (13 pp.).

Leonard DP et al., "Asymmetric electrode ionomer for low relative humidity operation of anion exchange membrane fuel cells," Journal of Materials Chemistry A, 2020, 8(28), 14135-14144.

Matanovic I et al., "Adsorption of polyaromatic backbone impacts the performance of anion exchange membrane fuel cells," Chemistry of Materials, 2019, 31(11), 4195-4204.

Maurya S et al., "On the origin of permanent performance loss of anion exchange membrane fuel cells: Electrochemical oxidation of phenyl group," Journal of Power Sources, 2019, 436, 226866.

Maurya S et al., "Polyaromatic Ionomers for High Performance Alkaline Membrane Fuel Cells," ECS Meeting Abstracts, 2019, MA2019-02, 1572 (3 pp.).

Maurya S et al., "Rational design of polyaromatic ionomers for alkaline membrane fuel cells with> 1 W cm-2 power density," Energy & Environmental Science, 2018, 11(11), 3283-3291.

Maurya S et al., "Surface adsorption affects the performance of alkaline anion-exchange membrane fuel cells," ACS Catalysis, 2018, 8(10), 9429-9439.

Meek KM et al., "High-Throughput Anion Exchange Membrane Characterization at Nrel," Ecs Transactions, 2019, 92(8), 723-731.

Mittelsteadt C et al., "Dimensionally Stable High Performance Membranes," presented at the 2016 U.S. Department of Energy (DOE) Hydrogen and Fuel Cells Program and Vehicle Technologies Office Annual Merit Review and Peer Evaluation Meeting on Jun. 6-10, 2019 in Washington, D.C., accessible at https://www.hydrogen.energy.gov/pdfs/review16/fc150_mittelsteadt_2016_p.pdf (last accessed Dec. 15, 2020), 19 pp.

Mohanty AD et al., "Mechanistic analysis of ammonium cation stability for alkaline exchange membrane fuel cells," Journal of Materials Chemistry A, 2014, 2(41), 17314-17320.

Mohanty AD et al., "Anion Exchange Fuel Cell Membranes Prepared from C—H Borylation and Suzuki Coupling Reactions," Macromolecules, 2014, 47, 1973-1980.

Norsten TB et al., "Highly fluorinated comb-shaped copolymers as proton exchange membranes (PEMs): improving PEM properties through rational design," Advanced Functional Materials, 2006, 16, 1814-1822.

Pagels M et al., "Synthetic Approach to Hydrocarbon Proton Exchange Membranes Using Anion Exchange Membrane Precursors," ECS Meeting Abstracts, 2020, MA2020-02, 2237 with Presentation (19 pp.).

Pagels MK et al., "Synthesis of anion conducting polymer electrolyte membranes by Pd-Catalyzed Buchwald-Hartwig Amination coupling reaction," Tetrahedron, 2019, 75(31), 4150-4155.

Pagels MK et al., Supporting Information for "One-Pot Synthesis of Proton Exchange Membranes from Anion Exchange Membrane Precursors," ACS Macro Letters, 2020, 9(10), 1489-1493 (14 pp.).

Park EJ et al., "Dimethyl Substituted Polyaromatic Alkaline Ionomers for Better Alkaline Hydrogen Oxidation," ECS Meeting Abstracts, 2018, MA2018091, 1753 (3 pp.).

Park EJ et al., "How does a small structural change of anode ionomer make a big difference in alkaline membrane fuel cell performance?," Journal of Materials Chemistry A, 2019, 7(43), 25040-25046.

Park EJ, "Chemically durable polymer electrolytes for solid-state alkaline water electrolysis," Journal of Power Sources, 2018, 375, 367-372.

Parrondo J et al., "Synthesis and Alkaline Stability of Solubilized Anion Exchange Membrane Binders Based on Poly(phenylene oxide) Functionalized with Quaternary Ammonium Groups via a Hexyl Spacer," Journal of the Electrochemical Society, 2015, 162, F1236-F1242.

Perret R et al., "IV.F.4 Hydrogen Fuel Cells and Storage Technology Project," in 2008 Annual Progress Report: DOE Hydrogen Program, U.S. Department of Energy, accessible at https://www.hydrogen.energy.gov/pdfs/progress08/iv_f_4_perret.pdf (last accessed Dec. 15, 2020), pp. 776-786.

Perret R et al., "IV.G.1 Hydrogen Fuel Cells and Storage Technology Project (FCAST)," in 2007 Annual Progress Report: DOE Hydrogen Program, U.S. Department of Energy, accessible at https://www.hydrogen.energy.gov/pdfs/progress07/iv_g_1_perret.pdf (last accessed Dec. 15, 2020), pp. 638-647.

Perret R et al., "IV.G.4 Fundamental Research for Optimization of Hydrogen Storage and Utilization," in 2006 Annual Progress Report: DOE Hydrogen Program, U.S. Department of Energy, accessible at https://www.hydrogen.energy.gov/pdfs/progress06/iv_g_4_perret.pdf (last accessed Dec. 15, 2020), pp. 575-581.

Perret R et al., "IV.H.5 Hydrogen Fuel Cells and Storage Technology Project," in 2009 Annual Progress Report: DOE Hydrogen Program, U.S. Department of Energy, accessible at https://www.hydrogen.energy.gov/pdfs/progress09/iv_h_5_perret.pdf (last accessed Dec. 15, 2020), pp. 801-807.

Powers W et al., "Borylation of Polystyrene: Random Blocky vs. Truly Random Copolymers," Bulletin of the American Physical Society, 2009, 54(1), C1.089 (1 p.).

Sepehr F et al., "Mesoscale Simulations of Anion Exchange Membranes Based on Quaternary Ammonium Tethered Triblock Copolymers," Macromolecules, 2017, 50, 4397-4405.

Sivakami JN et al., "'Kick-started' oxetanes in photoinitiated cationic polymerization: scale-up synthesis and structure-property studies," Proceedings of RadTech International UV & EB Technology Expo & Conference (held on May 15-18, 2016 in Chicago, IL), 2016, 5 pp.

Tian D et al., "Phosphoric Acid-Doped Biphenyl-Backbone Ion-Pair Coordinated Perns with Broad Relative Humidity Tolerance," ECS Meeting Abstracts, 2020, MA2020-02, 2240 (2 pp.).

Tian D et al., "Phosphoric Acid-Doped Ion-Pair Coordinated PEMs with Broad Relative Humidity Tolerance," Energies, 2020, 13(8), 1924 (14 pp.).

Trant C et al., "Impact of Microstructured Morphology on Macroscale Properties of Semi-Crystalline Triblock Copolymer Anion Exchange Membranes," ECS Meeting Abstracts, 2020, MA2020-01, 2267 (2 pp.).

Velasco VM et al., "Novel Aromatic Polymers with Pentafluorophenyl Pendant Groups," Macromolecules, 2008, 41, 8504-8512.

Walgama R et al., "The Effect of Backbone Structure on Functional Properties in Anion Exchange Membranes; Comparison of Poly (fluorene) with Poly (biphenylene) and Poly (terphenylene)s," ECS Meeting Abstracts, 2020, MA2020-02, 2268 (3 pp.).

Wang J et al., "Poly(aryl piperidinium) membranes and ionomers for hydroxide exchange membrane fuel cells," Nature Energy, 2019, 4, 392-398.

Wang J et al., Supplementary Information for "Poly(aryl piperidinium) membranes and ionomers for hydroxide exchange membrane fuel cells," Nature Energy, 2019, 4, 392-398 (13 pp.).

Wang T et al., "Poly (terphenylene) anion exchange membranes with high conductivity and low vanadium permeability for vanadium redox flow batteries (VRFBs)," Journal of Membrane Science, 2020, 598, 117665.

(56) References Cited

OTHER PUBLICATIONS

Wang T et al., "Suppressing vanadium crossover using sulfonated aromatic ion exchange membranes for high performance flow batteries," Materials Advances, 2020, 1(7), 2206-2218.
Wang T et al., Supplementary Information for "Suppressing vanadium crossover using sulfonated aromatic ion exchange membranes for high performance flow batteries," Materials Advances, 2020, 1(7), 2206-2218 (15 pp.).
Week PF et al., "Nanoscale building blocks for the development of novel proton-exchange membranes fuel cells: A first-principles study," Bulletin of the American Physical Society, 2008, 53(2), C1.095 (1 p.).
Wi SN et al., "Study of Water Dynamics in Superacidic Hydrocarbon Proton Exchange Membranes Using Solid-State and Pulsed-Field Gradient NMR Spectroscopy," National High Magnetic Field Laboratory 2015 Annual Research Report, 2015 (1 p.).
Xu H, "Novel Fluorinated Ionomer for PEM Fuel Cells," presented at the 2018 U.S. Department of Energy (DOE) Hydrogen and Fuel Cells Program and Vehicle Technologies Office Annual Merit Review and Peer Evaluation Meeting on Jun. 13-15, 2018 in Washington, DC, accessible at https://www.hydrogen.energy.gov/pdfs/review18/fc185_xu_2018_p.pdf (last accessed Dec. 15, 2020), 15 pp.
Yang ZT et al., "Photoinitiated cationic polymerization of sustainable epoxy and oxetane thermosets," Proceedings of RadTech International UV & EB Technology Expo & Conference (held on May 15-18, 2016 in Chicago, IL), 2016, 5 pp.
Yim W et al., "Development of Ultrafiltration Membrane-Separation Technology for Energy-Efficient Water Treatment and Desalination Process," Final Report for DOE Award No. DE-SC0005062, 2016, 18 pp.
Yin Z et al., "An alkaline polymer electrolyte CO2 electrolyzer operated with pure water," Energy & Environmental Science, 2019, 12, 2455-2462.
Yin Z et al., Supporting Information for "An alkaline polymer electrolyte CO2 electrolyzer operated with pure water," Energy & Environmental Science, 2019, 12, 2455-2462 (7 pp.).
Zelovich T et al., "Anion Exchange Membranes with Low Hydration Conditions from an Ab Initio Molecular Dynamics Perspective," ECS Meeting Abstracts, 2019, MA2019-01, 1957 (2 pp.).
Zeng QH et al., "Anion exchange membranes based on quatemized polystyrene-block-poly (ethylene-ran-butylene)-block-polystyrene for direct methanol alkaline fuel cells," Journal of Membrane Science, 2010, 349(1-2), 237-243.
U.S. Appl. No. 17/050,256, filed Oct. 23, 2020, Bae et al.
EP Office Action dated May 12, 2020, in Application No. 15860054.4.
Adhikari S et al., "Ionomers for Electrochemical Energy Conversion & Storage Technologies," Polymer, 2020, 123080.
Black SB et al., "FTIR characterization of water-polymer interactions in superacid polymers," The Journal of Physical Chemistry B, 2013, 117 (50), 16266-16274.
Brownell LV et al., "Synthesis of polar block grafted syndiotactic polystyrenes via a combination of iridium-catalyzed activation of aromatic C—H bonds and atom transfer radical polymerization," Journal of Polymer Science Part A: Polymer Chemistry, 2009, 47(23), 6655-6667.
Chang Y et al., "Acidity Effect on Proton Conductivity of Hydrocarbon-Based Ionomers," ECS Transactions, 2010, 33 (1), 735.
Chang Y et al., "Aromatic ionomers with highly acidic sulfonate groups: acidity, hydration, and proton conductivity," Macromolecules, 2011, 44 (21), 8458-8469.
Chang Y et al., "Direct Fluorination of the Carbonyl Group of Benzophenones Using Deoxo-Fluor®: Preparation of Bis (4-Fluorophenyl) Difluoromethane," Organic Syntheses, 2010, 87, 245-252.
Chang Y et al., "Direct nucleophilic fluorination of carbonyl groups of benzophenones and benzils with Deoxofluor," Tetrahedron, 2008, 64 (42), 9837-9842.
Chang Y et al., "Effect of superacidic side chain structures on high conductivity aromatic polymer fuel cell membranes," Macromolecules, 2015, 48(19), 7117-7126.
Chang Y et al., "Poly (Arylene Ether Sulfone) Ionomers with Different Acidity Strengths and Fuel Cell Membrane Properties," ECS Transactions, 2013, 50(2), 1031.
Chang Y et al., "Polymer electrolyte membranes based on poly (arylene ether sulfone) with pendant perfluorosulfonic acid," Polymer Chemistry, 2013, 4(2), 272-281.
Chang Y et al., "Polymer-supported acid catalysis in organic synthesis," Current Organic Synthesis, 2011, 8 (2), 208-236.
Chang Y et al., "Polystyrene Ionomers Functionalized with Partially Fluorinated Short Side-Chain Sulfonic Acid for Fuel Cell Membrane Applications," in Sustainable Membrane Technology for Energy, Water, and Environment, Ismail AF & Matsuura T (eds.), John Wiley & Sons, 2012, pp. 243-249.
Chang Y et al., "Polystyrene-Based Superacidic Ionomers: Synthesis and Proton Exchange Membrane Applications," ECS Transactions, 2011, 41 (1), 1615.
Date B et al., "Synthesis and morphology study of SEBS triblock copolymers functionalized with sulfonate and phosphonate groups for proton exchange membrane fuel cells," Macromolecules, 2018, 51(3), 1020-1030.
Guzman-Guiterrez, et al., "Dramatic Enhancement of Superacid-Catalyzed Polyhydroxyalkylation Reactions," Macromolecules, 2011, 44, pp. 194-202.
Han KW et al., "Molecular dynamics simulation study of a polysulfone-based anion exchange membrane in comparison with the proton exchange membrane," The Journal of Physical Chemistry C, 2014, 118(24), 12577-12587.
Jeon JY et al., "Efficient Preparation of Styrene Block Copolymer Anion Exchange Membranes via One-Step Friedel-Crafts Bromoalkylation with Alkenes," Organic Process Research & Development, 2019, 23(8), 1580-1586.
Jeon JY et al., "Functionalization of Syndiotactic Polystyrene via Superacid-Catalyzed Friedel-Crafts Alkylation," Topics in Catalysis, 2018, 61(7-8), 610-615.
Jo TS et al., "Highly efficient incorporation of functional groups into aromatic main-chain polymer using iridium-catalyzed C—H activation and Suzuki-Miyaura reaction," Journal of the American Chemical Society 131, 2009,(5), 1656-1657.
Jo TS et al., "Synthesis of quaternary ammonium ion-grafted polyolefins via activation of inert C—H bonds and nitroxide mediated radical polymerization," Journal of Polymer Science Part A: Polymer Chemistry, 2009, 47(18), 4519-4531.
Jo TS et al., "Synthesis of sulfonated aromatic poly(ether amide) s and their application to proton exchange membrane fuel cells," Journal of Polymer Science Part A: Polymer Chemistry, 2009, 47(2), 485-496.
Kim E et al., "Nanoscale building blocks for the development of novel proton exchange membrane fuel cells," The Journal of Physical Chemistry B, 2008, 112(11), 3283-3286.
Kim JH et al., "Fabrication of dense cerium pyrophosphate-polystyrene composite for application as low-temperature proton-conducting electrolytes," Journal of the Electrochemical Society, 2015, 162(10), F1159-F1164.
Kimura KW et al., "Selective Electrochemical $CO_2$ Reduction during Pulsed Potential Stems from Dynamic Interface," ACS Catalysis, University of Illinois at Urbana-Champaign, Published Jun. 24, 2020, 31 pages.
Le TP et al., "Miscibility and acid strength govern contact doping of organic photovoltaics with strong polyelectrolytes," Macromolecules, 2015, 48(15), 5162-5171.
Lee WH et al., "Molecular Engineering of Aromatic Polymer Electrolytes for Anion Exchange Membranes," ECS Transactions, 2017, 80(8), 941-944.
Lee WH et al., "Molecular Engineering of Ion-Conducting Polymers for Fuel Cell Membrane Applications," ECS Transactions, 2015, 69(17), 357-361.
Lee YB et al., "Effect of Ammonium Ion Structures on Properties of Alkaline Exchange Membrane Fuel Cells," ECS Transactions, 2010, 33(1), 1889-1892.

(56) References Cited

OTHER PUBLICATIONS

Luo X et al., "Mesoscale Simulations of Quaternary Ammonium-Tethered Triblock Copolymers: Effects of the Degree of Functionalization and Styrene Content," Journal of Physical Chemistry C, 2020, 124(30), 16315-16323.
Mochizuki T et al., "Simple, Effective Molecular Strategy for the Design of Fuel Cell Membranes: Combination of Perfluoroalkyl and Sulfonated Phenylene Groups," ACS Energy Letters, 2016, 1(2), 348-352 (Abstract and Supporting Information only, 11 pp.).
Mohanty AD et al., "Stable Elastomeric Anion Exchange Membranes Based on Quaternary Ammonium-Tethered Polystyrene-b-poly(ethylene-co-butylene)-b-polystyrene Triblock Copolymers," Macromolecules, 2015, 48(19), 7085-7095.
Mohanty AD et al., "Systematic alkaline stability study of polymer backbones for anion exchange membrane applications," Macromolecules, 2016, 49(9), 3361-3372.
Mohanty AD et al., "Systematic Analysis of Cation Stability in Alkaline Exchange Membrane Fuel Cells," ECS Transactions, 2014, 64(3), 1221-1228.
Mohanty AD et al., "Thermochemical stability study of alkyl-tethered quaternary ammonium cations for anion exchange membrane fuel cells," Journal of the Electrochemical Society, 2017, 164(13), F1279-F1285.
Mohanty AD et al., "Transition Metal-Catalyzed Functionalization of Polyolefins Containing C—C, C=C, and C—H Bonds," Advances in Organometallic Chemistry, 2015, 64, 1-39.
Noh S et al., "Molecular engineering of hydroxide conducting polymers for anion exchange membranes in electrochemical energy conversion technology," Accounts of Chemical Research, 2019, 52(9), 2745-2755.
Pagels MK et al., "One-Pot Synthesis of Proton Exchange Membranes from Anion Exchange Membrane Precursors," ACS Macro Letters, 2020, 9(10), 1489-1493.
Park EJ et al., "Superacidic porous polymer catalyst and its application in esterification of carboxylic acid," Structural Chemistry, 2017, 28(2), 493-500.
Park EJ et al., "Versatile functionalization of aromatic polysulfones via thiol-ene click chemistry," Journal of Polymer Science Part A: Polymer Chemistry, 2016, 54(19), 3237-3243.
Park IS et al., "Sulfonated Polyamide Based IPMCs," Proceedings of SPIE, Electroactive Polymer Actuators and Devices (EAPAD) 2009, 7287, 72870X.
Park J et al., "A comparison study of ionic polymer-metal composites (IPMCs) fabricated with Nafion and other ion exchange membranes," Proceedings of SPIE, Electroactive Polymer Actuators and Devices (EAPAD) 2013, 8687, 868714.
Park J et al., "Electromechanical performance and other characteristics of IPMCs fabricated with various commercially available ion exchange membranes," Smart materials and structures, 2014, 23(7), 074001.
Pena ER et al., "Factors Enhancing the Reactivity of Carbonyl Compounds for Polycondensations with Aromatic Hydrocarbons. A Computational Study," Macromolecules, 2004, 37(16), 6227-6235.
Shin D et al., "Ch. 8: Anion Exchange Membranes: Stability and Synthetic Approach," in the Chemistry of Membranes Used in Fuel Cells: Degradation and Stabilization, S. Schlick (eds.), Wiley, 2018, pp. 195-228.
Shin J et al., "A new homogeneous polymer support based on syndiotactic polystyrene and its application in palladium-catalyzed Suzuki-Miyaura cross-coupling reactions," Green Chemistry, 2009, 11(10), 1576-1580.
Shin J et al., "Borylation of Polystyrene," Synfacts 2008 (2), 145.
Shin J et al., "Controlled Functionalization of Crystalline Polystyrenes via Activation of Aromatic C—H Bonds," Macromolecules, 2007, 40(24), 8600-8608.
Shin J et al., "Hydrophilic functionalization of syndiotactic polystyrene via a combination of electrophilic bromination and Suzuki-Miyaura reaction," Journal of Polymer Science Part A: Polymer Chemistry, 2010, 48(19), 4335-4343.
Shin J et al., "Hydrophilic graft modification of a commercial crystalline polyolefin," Journal of Polymer Science Part A: Polymer Chemistry, 2008, 46(11), 3533-3545.
Smedley SB et al., "Measuring water hydrogen bonding distributions in proton exchange membranes using linear Fourier Transform Infrared spectroscopy," Solid State Ionics, 2015, 275, 66-70.
Smedley SB et al., "Spectroscopic Characterization of Sulfonate Charge Density in Ion-Containing Polymers," The Journal of Physical Chemistry B, 2017, 121(51), 11504-11510.
Tian D et al., "Structure and gas transport characteristics of triethylene oxide-grafted polystyrene-b-poly(ethylene-co-butylene)-b-polystyrene," Journal of Polymer Science 2020, 58(18), 2654-2663.
Trant C et al., "Synthesis and Characterization of Anion-Exchange Membranes Using Semicrystalline Triblock Copolymers in Ordered and Disordered States," Macromolecules 2020, 53(19), 8548-8561.
Xu Y et al., "Self-Cleaning $CO_2$ Reduction Systems: Unsteady Electrochemical Forcing Enables Stability," ACS Energy Lett., 2021, 6, 809-815.
Yokota et al., "Anion Conductive Aromatic Block Copolymers Continuing Diphenyl Ether or Sulfide Groups for Application to Alkaline Fuel Cells," vol. 6, No. 19, Oct. 8, 2014, pp. 17044-17052.
Zelovich T et al., "Ab initio molecular dynamics study of hydroxide diffusion mechanisms in nanoconfined structural mimics of anion exchange membranes," The Journal of Physical Chemistry C, 2019, 123(8), 4638-4653.
Zelovich T et al., "Hydroxide ion diffusion in anion-exchange membranes at low hydration: insights from ab initio molecular dynamics," Chemistry of Materials, 2019 31(15), 5778-5787.
Zhu L et al., "Effects of tertiary amines and quaternary ammonium halides in polysulfone on membrane gas separation properties," Journal of Polymer Science Part B: Polymer Physics, 2018, 56(18), 1239-1250.
Office Action dated Oct. 14, 2021, in Application No. 16/842,037.
Office Action dated May 25, 2021, in U.S. Appl. No. 16/553,965.
Office Action dated Sep. 3, 2021, in U.S. Appl. No. 16/553,965.
Office Action dated May 25, 2021, in U.S. Appl. No. 16/788,506.
Notice of Allowance dated Sep. 8, 2021, in U.S. Appl. No. 16/788,506.
International Preliminary Report on Patentability dated Jun. 25, 2019 in Application No. PCT/US2017/067482.
International Preliminary Report on Patentability (full version) dated Nov. 5, 2020, in Application No. PCT/US2019/028925.
International Search Report and Written Opinion dated May 27, 2021, in Application No. PCT/US2021/014759.
Chang Y et al., "Scope and regioselectivity of iridium-catalyzed C—H borylation of aromatic main-chain polymers," Macromolecules, 2013, 46 (5), 1754-1764.
U.S. Appl. No. 17/309,401, filed May 25, 2021, Bae et al.
EP Partial Supplementary European Search Report dated Dec. 20, 2021, in application No. EP19791619.0.
Notice of Allowance dated Nov. 22, 2021 in U.S. Appl. No. 16/553,965.
U.S. Corrected Notice of Allowability dated Dec. 27, 2021, in U.S. Appl. No. 16/553,965.
U.S Corrected Notice of Allowability dated Dec. 15, 2021 in U.S. Appl. No. 16/788,506.
CA Office Action dated Jul. 29, 2022, in Application No. CA2968110.
Cai, M. et al., "Synthesis and Characterization of Poly(ether ketone ether ketone ketone)/Poly(ether ether ketone ketone) Copolymers Containing Naphthalene and Pendant Cyano Groups", Journal of Applied Polymer Science, 2009, vol. 112, pp. 3225-3231.
Chang, J. Y. et al., "Synthesis of a Linear Phenolic Polymer by an Aromatic Electrophilic Substitution Reaction", Macromolecules, 1997, vol. 30, pp. 8075-8077.
Clendinning, R. A, et al., "Poly(aryl Ether Ketone) Block and Chain-extended Copolymers. 1. Preparation and Characterization of a New Class of Functional Poly(aryl Ether Ketone) Oligomers", Macromolecules, 1993, vol. 26, 2361-2365.
Colquhoun, H. M, et al., "Superelectrophiles in Aromatic Polymer Chemistry", Macromolecules, 2001, vol. 34, pp. 1122-1124.
Cruz, A.R. et al., "Precision Synthesis of Narrow Polydispersity, Ultrahigh Molecular Weight Linear Aromatic Polymers by $A_2 + B_2$ Nonstoichiometric Step-Selective Polymerization", Macromolecules, 2012, vol. 45, pp. 6774-6780.

(56) References Cited

OTHER PUBLICATIONS

Diaz, A. M. et al., "A Novel, One-Pot Synthesis of Novel 3F, 5F, and 8F Aromatic Polymers", Macromolecular Rapid Communication, 2007, vol. 28, pp. 183-187.
EP Search report dated Mar. 11, 2022, in Application No. EP19791619.0.
Extended European search report dated Jul. 22, 2022, in Application No. EP19889097.2.
Florin, R. E., "Catalyst Specificity in Friedel-Crafts Copolymerization", Journal of the American Chemical Society, 1951, vol. 73, No. 9, pp. 4468-4470.
Fox, C. J, et al., "The Synthesis of Polymers via Acylation of Triphenylamine", Macromolecular Chemistry and Physics, Mar. 15, 1965, vol. 82, No. 1, 53-59.
Fritz, A. et al., "Synthesis of Aryleneisopropylidene Polymers", Journal of Polymer Science, 1972, vol. 10, pp. 2365-2378.
George, J. et al., "Inhibition of Friedel-Crafts Polymerization. I. The Mechanism of Inhibition", Journal of the American Chemical Society, 1950, vol. 72, No. 9, pp. 3891-3896.
George, J. et al., "Inhibition of Friedel-Crafts Polymerization. II. Factors Affecting Inhibitor Power", Journal of the American Chemical Society, 1950, vol. 72, No. 9, pp. 3896-3901.
Goseki, R et al., "Synthesis of a Well-defined Alternating Copolymer of 1,1-diphenylethylene and Tert-butyldimethyl-silyloxymethyl Substituted Styrene by Anionic Copolymerization: Toward Tailored Graft Copolymers With Controlled Side-chain Densities", Polymer Chemistry, 2019, vol. 10, pp. 6413-6422.
Guzman-Gutierrez, M. T. et al., "Structure-properties Relationship for the Gas Transport Properties of New Fluoro-containing Aromatic Polymers", Journal of Membrane Science, 2011, vol. 385-386, pp. 277-284.
Guzman-Gutierrez, M. T. et al., "Synthesis and Gas Transport Properties of New Aromatic 3F Polymers", Journal of Membrane Science, 2008, vol. 323, pp. 379-385.
Haque, M.A. et al., "Acid Doped Polybenzimidazoles Based Membrane Electrode Assembly for High Temperature Proton Exchange Membrane Fuel Cell: A Review", International Journal of Hydrogen Energy, 2017, vol. 42, No. 14, pp. 9156-9179.
He, R. et al., "Proton Conductivity of Phosphoric Acid Doped Polybenzimidazole and Its Composites with Inorganic Proton Conductors", Journal of Membrane Science, Dec. 1, 2003, vol. 226, No. 1-2, pp. 169-184.
Hernandez, M.G. et al., "Novel, Metal-Free, Superacid-Catalyzed "Click" Reactions of Isatins with Linear, Nonactivated, Multiring Aromatic Hydrocarbons", Macromolecules, 2010, vol. 43, pp. 6968-6979.
Huang, B. et al., "Synthesis and Characterization of Poly(ether amide ether ketone)/Poly(ether ketone ketone) Copolymers", Journal of Applied Polymer Science, 2011, vol. 119, pp. 647-653.
IN Office Action dated Mar. 23, 2022 in Application No. IN202037050645.
International Preliminary Report on Patentability and written opinion dated May 27, 2021 in Application PCT/2021/US14759.
Jeong, Y. et al., "Polymerization of a Photochromic Diarylethene by Friedel-Crafts Alkylation", Macromolecules, 2006, vol. 39, pp. 3106-3109.
KR Office Action dated Feb. 28, 2022, in KR Application No. KR1020177016429 with English translation.
Lim, H. et al., "Synthesis of Microporous Polymers by Friedel-crafts Reaction of 1-bromoadamantane with Aromatic Compounds and Their Surface Modification", Polymer Chemistry, 2012, vol. 3, pp. 868-870.
Liu, Z. et al., "$BF_3 \cdot Et_2O$-mediated Friedel-Crafts C—H bond polymerization to synthesize π-conjugation-interrupted polymer semiconductors", Polymer Chemistry, 2011, vol. 2, pp. 2179-2182.
Maeyama, K. et al., "2,2'-Bis(4-benzoylphenoxy)biphenyl: A Novel Efficient Acyl-acceptor Monomer Yielding Wholly Aromatic Polyketones via Friedel-Crafts Type Polymerization with Arenedicarbonyl Chloride", Polymer Journal, 2004, vol. 36, No. 2, pp. 146-150.
Maeyama, K. et al., "Effective Synthesis of Wholly Aromatic Polyketones Using 2,2'-Diaryloxybiphenyl and Arenedicarboxylic Acid Derivatives via Friedel-crafts Type Acylation Polymerization", Reactive & Functional Polymers, 2004, vol. 61, pp. 71-79.
Mallakpour, S. E. et al., "Polymerization of N-methylpyrrole With Bis-triazolinediones via Electrophilic Aromatic Substitution", Journal of Polymer Science: Part A: Polymer Chemistry, Oct. 1987, vol. 25, 2781-2790.
Mallakpour, S. E, et al., "Uncatalyzed Polymerization of Bistriazolinediones with Electron-Rich Aromatic Compounds via Electrophilic Aromatic Substitution", Journal of Polymer Science: Part A: Polymer Chemistry, 1989, vol. 27, 217-235.
Nystuen, N. J, et al., "Friedel-crafts Polymerization of Fluorene With Methylene Chloride, Methoxyacetyl Chloride, and Chloromethyl Methyl Ether", Journal of Polymer Science, 1985, vol. 23, 1433-1444.
Olvera, L.I. et al., "Novel High Molecular Weight Aromatic Fluorinated Polymers from One-Pot, Metal-Free Step Polymerizations", Macromolecules 2013, vol. 46, pp. 7245-7256.
Parshad, R., "Determination of Transverse Wave Velocities in Solids", Nature, Nov. 30, 1946, vol. 158, pp. 789-790.
Tipper, C. F. H., et al., "Some Reactions of Cyclopropane and a Comparison With the Lower Olefins. Part IV. Friedel-crafts Polymerisation", Journal of the Chemical Society, 1959, pp. 1325-1359.
U.S. Appl. No. 17/758,767, inventors Bae et al., filed Jul. 13, 2022.
Yonezawa, N. et al., "Electrophilic Aromatic Acylation Synthesis of Wholly Aromatic Polyketones Composed of 2,2'-Dimethoxybiphenylene Units", 2003, Polymer Journal, vol. 35, No. 12, pp. 998-1002.
Yonezawa, N, et al., "Synthesis of Wholly Aromatic Polyketones", Polymer Journal, 2009, vol. 41, No. 11, pp. 899-928.
CN Office Action dated Sep. 5, 2022 in Application No. CN202010532979.2 with English translation.
CN Office Action dated Sep. 1, 2022, in Application No. CN201980041740 with English translation.
U.S. Non-Final office Action dated Sep. 29, 2022 in U.S. Appl. No. 17/658,627.

\* cited by examiner

PROTON EXCHANGE MEMBRANE MATERIAL AND METHODS OF MAKING THE SAME

CROSS REFERENCE TO RELATED APPLICATION(S)

This application is a national stage patent filing of International Patent Application No. PCT/US2017/067482, filed Dec. 20, 2017, which claims the benefit of U.S. Provisional Application Nos. 62/436,627, filed Dec. 20, 2016, and 62/599,045, filed Dec. 15, 2017, which are incorporated by reference as if disclosed herein in their entirety.

STATEMENT REGARDING FEDERALLY SPONSORED RESEARCH OR DEVELOPMENT

This invention was made with government support under grant no. DE-EE0007647 awarded by Department of Energy. The government has certain rights in the invention.

BACKGROUND

Cation or proton exchange membranes facilitate transportation of cations, e.g., H+, Na+, etc., from an anode to a cathode in an electrochemical reaction. Proton exchange membranes are found in myriad of systems and applications, such as the generation of electricity and water in a fuel cell, the splitting of water into hydrogen and oxygen in water hydrolysis, as well as batteries, sensors, hydrogen compressors, and actuators.

In the case of fuel cells and water hydrolysis, protons (H+) are transported through the proton exchange membrane with the help of water molecules. Most hydrocarbon-based proton exchange membranes are prepared from polymers contain aryl-ether linkages, which are not chemically stable in highly acidic conditions. Further, these membranes typically struggle to match the proton conductivity performance of commercial perfluorinated membranes such as Nafion® (E. I. du Pont de Nemours and Company, Wilmington, Del.), particularly at low relative humidity levels. However, Nafion®-based membranes are expensive, not designed for use in applications such as fuel cells and water hydrolysis, and disadvantagous for use in certain other applications such as batteries and hydrogen compressors.

SUMMARY

Some embodiments of the disclosed subject matter are directed to a polymeric material including a polyaryl main chain substantially, free of ether linkages, and including strongly acidic side chains. The main chain is substantially hydrophobic while acidic groups in the acidic side chains are substantially hydrophilic. The hydrophobic and hydrophilic regions on the polymer create a phase-separated morphology that affords enhanced transport of protons and water across the membrane even at low relative humidity levels.

In some embodiments, the main chain of the polymeric material includes a biphenyl group and a $CF_3$ group. In some embodiments, the acid side chains include a hydrocarbon tether terminated by a strongly acidic group, such as a fluoroalkyl sulfonate group. These materials are advantageous for use as membranes for use in fuel cells, redox flow batteries, water hydrolysis systems, sensors, electrochemical hydrogen compressors, actuators, water purifiers, gas separators, etc.

BRIEF DESCRIPTION OF THE DRAWINGS

The drawings show embodiments of the disclosed subject matter for the purpose of illustrating the invention. However, it should be understood that the present application is not limited to the precise arrangements and instrumentalities shown in the drawings, wherein.

DETAILED DESCRIPTION

Figure 1:
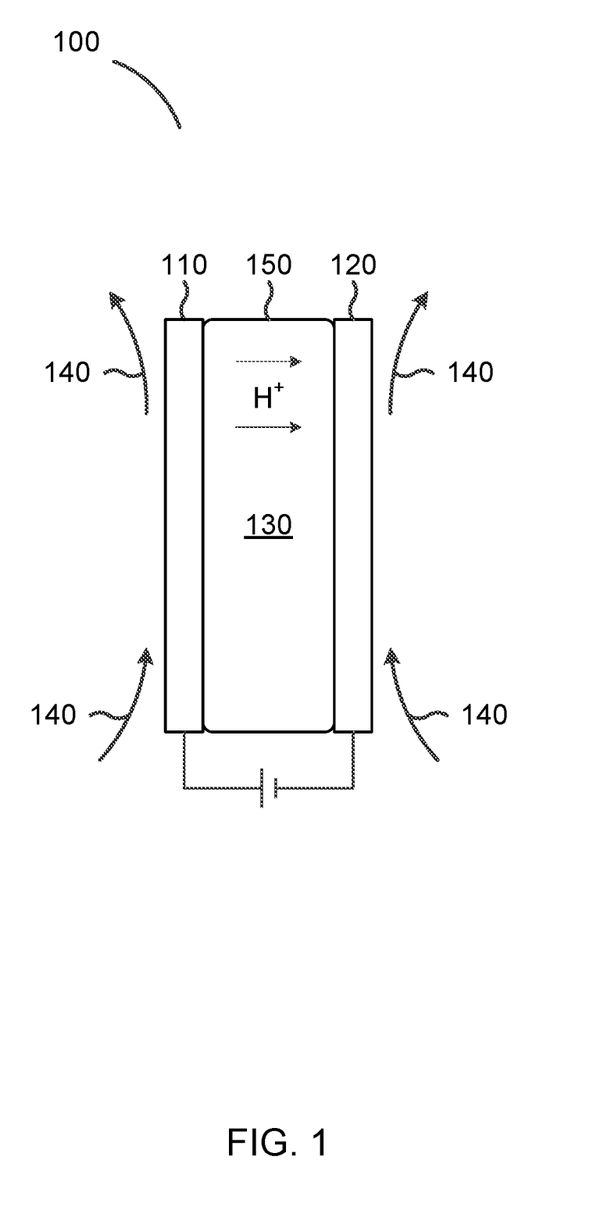
FIG. 1 is a schematic drawing of an electrochemical energy conversion system including a proton exchange membrane according to some embodiments of the present disclosure.

Referring now to FIG. 1, aspects of the disclosed subject matter include an electrochemical energy conversion system 100 including an anode 110, a cathode 120, and an electrolyte 130 disposed between the anode and the cathode. System 100 is suitable for use in numerous applications, such as fuel cells, redox flow batteries, water hydrolysis systems, sensors, electrochemical hydrogen compressors, actuators, water purifiers, gas separators, etc. In some embodiments, anode 110 and cathode 120 are composed of any suitable material for use with electrolyte 130 in system 100. Further, system 100 includes any suitable inlets/outlets 140 to supply reactants to and remove reaction products from anode 110, cathode 120, and electrolyte 130.

In some embodiments, electrolyte 130 is a solid electrolyte. In some embodiments, electrolyte 130 is an ion exchange membrane. In some embodiments, electrolyte 130 is a proton exchange membrane 150. In some embodiments, proton exchange membrane 150 is composed of a material which has a substantially ether-free polyaryl main chain and acidic side chains. In some embodiments, the polyaryl main chain is substantially hydrophobic while the side chain is substantially hydrophilic. In some embodiments, the material is a block copolymer. In some embodiments, the material includes a polymer according to the following formula I:

(formula I)

In some embodiments, Ar includes at least one aryl group, $R^1$ includes a haloalkyl group, $R^2$ includes an acidic chain, and r is greater than at least about 100. In some embodiments, r is greater than at least about 1000. In some embodiments, r is greater than at least about 10000. In some embodiments, r is greater than at least about 100000. As used herein, the term "halo" is used to indicate the inclusion of a halogen, e.g., fluorine. Further, as used herein, the term "alkyl" is used to indicate a hydrocarbon structure.

In some embodiments, the at least one aryl group Ar includes no ether group. In some embodiments, there is no ether group adjacent the at least one aryl group Ar. The absence of these ether groups increases the chemical stabil- ity of the material in highly acidic conditions. In some embodiments, the at least one aryl group Ar is a polyphenyl group, e.g., biphenyl, triphenyl, terphenyl, etc. In some embodiments, the at least one aryl group Ar further includes a hydrocarbon chain. The hydrocarbon chain can be linear or branched, substituted or unsubstituted. In some embodiments, the at least one aryl group Ar includes:

or combinations thereof.

As discussed above, the polyaryl main chain is substantially hydrophobic. In some embodiments, the at least one aryl group Ar is substantially hydrophobic. In some embodiments, the haloalkyl group $R^1$ is also a substantially hydrophobic group. In some embodiments, the haloalkyl group $R^1$ is a haloalkane. In some embodiments, $R^1$ includes $CF_3$. Further embodiments and examples of the polymeric main chain, as well as methods of making of the same, can be found in International Application No. PCT/US2015/061036, published as WO/2016/081432, which is incorporated herein by reference in its entirety.

In some exemplary embodiments, the material includes a polymer according to the following structure of formula 1A:

(formula 1A)

In some embodiments, r is greater than at least about 100. In some embodiments, r is greater than at least about 1000. In some embodiments, r is greater than at least about 10000. In some embodiments, r is greater than at least about 100000. As can be seen in formula 1A, in this exemplary embodiment, Ar from formula I is a biphenyl group In some embodiments of formula 1A, x+y=1. In some embodiments, x=1 and y=0. In some embodiments, x is about 0.4 to about 0.7, while y is about 0.3 to about 0.6, including all the integers there between. In some embodiments, x is about 0.65, while y is about 0.35. In some embodiments, x is about 0.44, while y is about 0.56.

In some embodiments, acidic side chain $R^2$ includes a hydrocarbon tether connecting the main chain with an acidic group. In some embodiments, acidic side chain $R^2$ includes the following structure of formula II:

(formula II)

In some embodiments, $R^3$ includes at least one acidic group, and n is from 1 to about 20. In some embodiments, other than the presence of $R^3$, the hydrocarbon tether is unsubstituted. In some embodiments, in addition to $R^3$, the hydrocarbon tether includes at least one substitution.

In some embodiments, $R^3$ is strongly electron withdrawing. In some embodiments, $R^3$ includes at least one haloalkyl sulfonate group, halophenyl sulfonate group, alkyl sulfonate group, sulfonate group, alkyl phosphonate group, alkyl carboxylate group, a substituted hydrocarbon including at least one haloalkyl sulfonate group, halophenyl sulfonate group, alkyl sulfonate group, sulfonate group, alkyl phosphonate group, alkyl carboxylate group, or combinations thereof. In some embodiments, $R^3$ includes at least one fluoroalkyl sulfonate group and/or a substituted hydrocarbon including at least one fluoroalkyl sulfonate group. In some embodiments, $R^3$ includes $CF_2CF_2OCF_2CF_2SO_3H$. In some embodiments, $R^3$ includes the following structure of formula III:

(formula III)

In some exemplary embodiments, the material includes a polymer according to the following structure of formula IV:

(formula IV)

In some embodiments, r is greater than at least about 100. In some embodiments, r is greater than at least about 1000. In some embodiments, r is greater than at least about 10000. In some embodiments, r is greater than at least about 100000. As can be seen in formula IV, in this exemplary embodiment, Ar from formula I is a biphenyl group

In some embodiments, at least one $R^4$ includes an acidic group. In some embodiments, $R^4$ is selected from hydrogen, a haloalkyl sulfonate group, a halophenyl sulfonate group, an alkyl sulfonate group, a sulfonate group, an alkyl phosphonate group, an alkyl carboxylate group, or a substituted hydrocarbon including at least one haloalkyl sulfonate group, halophenyl sulfonate group, alkyl sulfonate group, sulfonate group, alkyl phosphonate group, or alkyl carboxylate group, or combinations thereof. In some embodiments, at least one $R^4$ includes a fluoroalkyl sulfonate group or a fluorophenyl sulfonate group. In some embodiments, at least one $R^4$ includes $CF_2CF_2OCF_2CF_2SO_3H$. In some embodiments, at least one $R^4$ includes the structure of formula III above.

In some embodiments, the polymer includes the following structure:

BP-SA

In other embodiments, the polymer includes the following structure:

BP-Ar-PFSA

For BP-SA and BP-Ar-PFSA, the polymer includes acidic sulfonate groups connected to the aromatic polymer backbone via a flexible tether, e.g., a linear alkyl chain for BP-SA and a fluoroalkyl chain for BP-Ar-PFSA.

In yet other embodiments, the polymer includes the following structure:

BP-PFSA2

$R = CF_2CF_2OCF_2CF_2SO_3H$

-continued

BP-PFSA3

R = CF$_2$CF$_2$OCF$_2$CF$_2$SO$_3$H

In some embodiments, proton exchange membrane 150 is composed substantially entirely of material consistent with the embodiments described above. In some embodiments, the material is incorporated into or attached to a base polymeric structure, such as a commercially available membrane.

Figure 2:
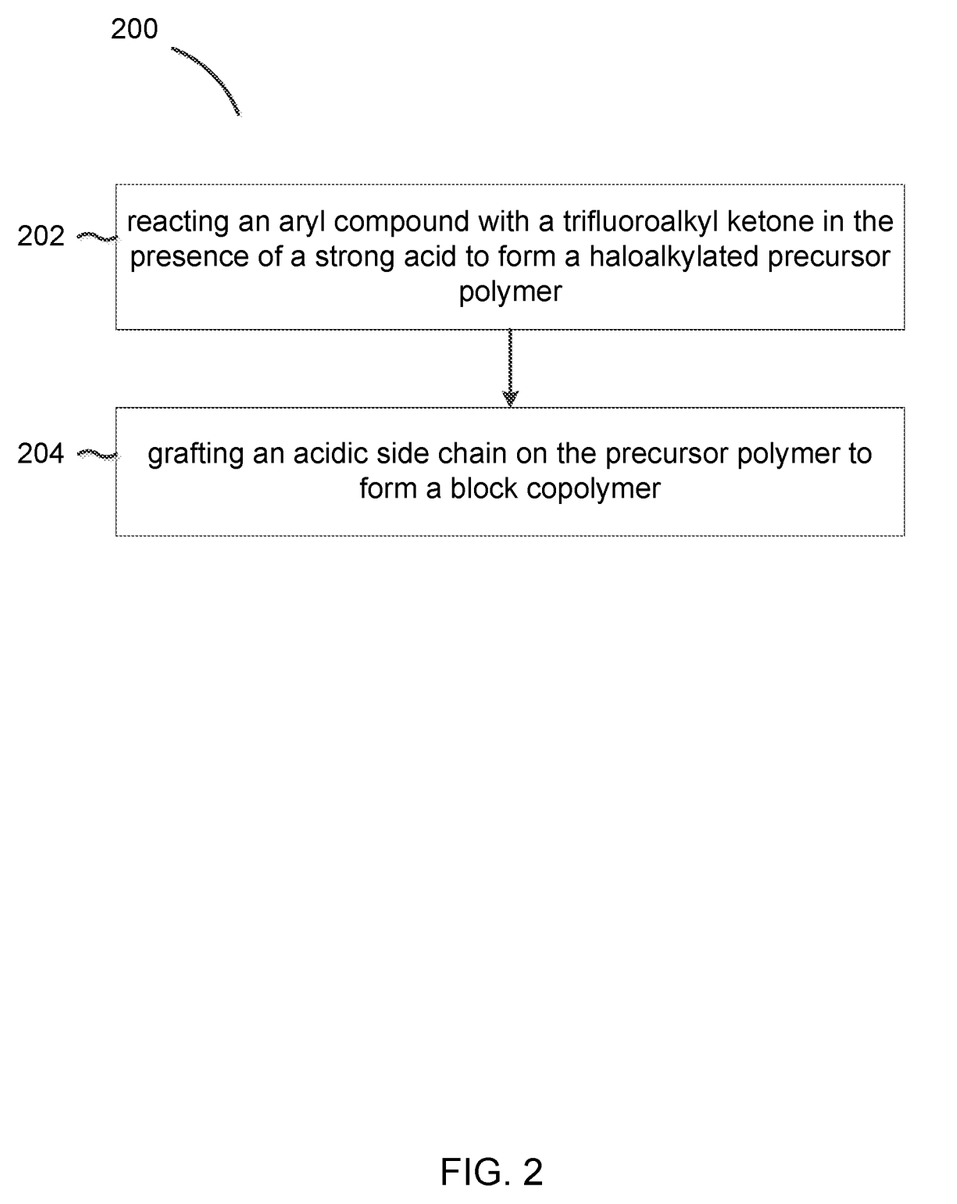
FIG. 2 is a chart of a method for making a proton exchange membrane according to some embodiments of the present disclosure.

Referring now to FIG. 2, some aspects of the disclosed subject matter include a method 200 of making a proton exchange membrane material. In some embodiments, at 202, an aryl compound is reacted with a trifluoroalkyl ketone in the presence of a strong acid to form a haloalkylated precursor polymer. At 204, an acidic side chain is grafted on the precursor polymer. In some embodiments, the acidic side chain is grafted from and/or to the precursor polymer. The reaction materials suitable for use in method 200 are those resulting in a material with a structure consistent with those shown in formulas I-IV above.

Figure 3:
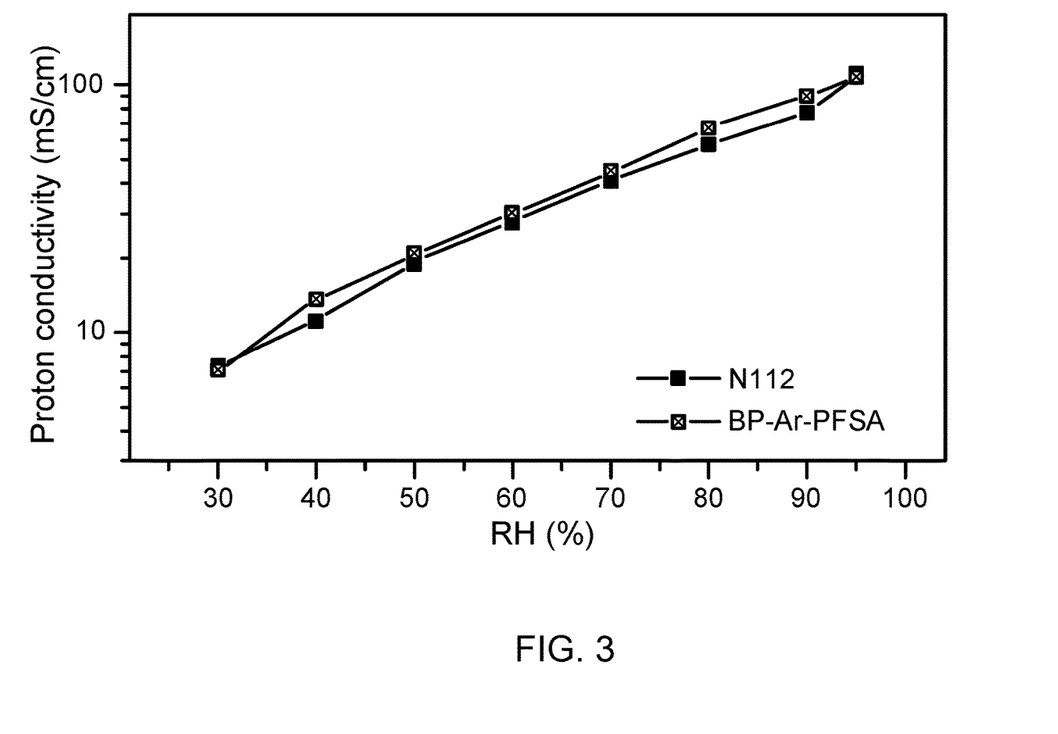
FIG. 3 is a graph comparing the proton conductivity of Nafion® to the materials according to some embodiments of the present disclosure.

The polymeric materials consistent with the embodiments of the present disclosure are advantageous for use as membrane materials, particularly in high temperature, low relative humidity applications. The ether-free polyaryl backbone of the polymeric main chain provides increased chemical stability under acidic conditions. Additionally, the materials of the present disclosure benefit from the presence of heavy fluorine-including side chains that reduce swelling. As a result, membranes including the material according to the present disclosure maintain mechanical stability. Further, the performance of these materials compares favorably to perfluorosulfonic acid polymers such as Nafion®. Referring to FIG. 3, the materials of the present disclosure exhibit similar proton conductivity to Nafion® due to the relatively strong acidity of the acidic side chains produced from the acidic groups. Further the combined effects of the hydrophobic main chain, the hydrophilic, acidic side chain, and hydrocarbon tether separating them advantageously create a nanoscale phase separated morphology like that of Nafion® that enhances transport of protons and water. However, while materials such as Nafion® are expensive to produce and modify, the substantially hydrocarbon structure of the materials according to the present disclosure are manufactured at a much lower cost and are easier to modify and tune for specific applications.

Although the disclosed subject matter has been described and illustrated with respect to embodiments thereof, it should be understood by those skilled in the art that features of the disclosed embodiments can be combined, rearranged, etc., to produce additional embodiments within the scope of the invention, and that various other changes, omissions, and additions may be made therein and thereto, without parting from the spirit and scope of the present invention.

What is claimed is:

1. A proton exchange membrane material comprising a polymer according to formula I:

(formula I)

wherein Ar includes at least two or three aryl groups, R$^1$ includes a halomethyl, R$^2$ includes a flexible hydrocarbon tether having the structure according to formula II:

(formula II)

wherein R$^3$ comprises an acidic group comprising a sulfonate group, a phosphonate group, or a carboxylate group, wherein each of the sulfonate, the phosphonate and the carboxylate groups may be optionally substituted, and n is from 2 to about 20, r is greater than at least about 100, and no ether group is adjacent the at least two aryl groups.

2. The proton exchange membrane material according to claim 1, wherein the Ar including two or three aryl groups includes:

(1)

(2)

(3)

-continued or combinations thereof.

3. The proton exchange membrane material according to claim 2, wherein the Ar is

.

4. The proton exchange membrane material according to claim 1, wherein the halomethyl comprises $CF_3$.

5. The proton exchange membrane material according to claim 1, wherein $R^3$ comprises a fluorophenyl sulfonate group.

6. The proton exchange membrane material according to claim 1, wherein $R^3$ comprises a fluoroalkyl sulfonate group.

7. The proton exchange membrane material according to claim 1, wherein $R^3$ comprises:
$CF_2CF_2SO_3H$ or $SO_3H$.

8. The proton exchange membrane material according to claim 1, wherein the polymer is the structure according to the following formula:

wherein x+y=1 and x>0.

9. The proton exchange membrane material according to claim 1, wherein the polymer is a block copolymer or a multiblock copolymer.

10. An electrochemical energy conversion system comprising:
an anode;
a cathode; and
a proton exchange membrane disposed between the anode and the cathode,
wherein the proton exchange membrane includes a polymer comprising a structure according to formula I:

(formula I)

wherein:
Ar includes at least two or three aryl groups;
$R^1$ includes a halomethyl;
$R^2$ includes a flexible hydrocarbon tether having the structure according to formula II:

(formula II)

in which $R^3$ comprises an acidic group comprising a sulfonate group, a phosphonate group, or a carboxylate group, wherein each of the sulfonate, the phosphonate and the carboxylate groups may be optionally substituted, and n is from 2 to about 20; and
r is greater than at least about 100, and
wherein no ether group is adjacent the at least two aryl groups.

11. The system according to claim 10, wherein the Ar including two or three aryl groups includes:

(1)

(2)

(3)

(4)

(5)

-continued (6)

(7)

(8)

or combinations thereof.

12. The system according to claim 10, wherein the halomethyl comprises $CF_3$.

13. The system according to claim 10, wherein $R^3$ comprises at least one of a fluoroalkyl sulfonate group or a fluorophenyl sulfonate group.

* * * * *